United States Patent [19]

Umemura et al.

[11] 3,895,051
[45] July 15, 1975

[54] CATALYST AND PROCESS FOR OXIDIZING OR AMMOXIDIZING N-BUTENES AND/OR ISOBUTENE

[75] Inventors: Sumio Umemura; Kyoji Ohdan; Kazuo Fukuda; Terumi Hisayuki, all of Ube, Japan

[73] Assignee: Ube Industries, Ltd., Ube, Japan

[22] Filed: Apr. 27, 1973

[21] Appl. No.: 355,301

[30] Foreign Application Priority Data
June 9, 1972 Japan................................ 47-56859

[52] U.S. Cl. ............. 260/465.3; 252/456; 252/467; 252/468; 260/604 R; 260/680 E
[51] Int. Cl. .......................................... C07c 121/02
[58] Field of Search ...................... 260/465.3, 680 E

[56] References Cited
FOREIGN PATENTS OR APPLICATIONS
46-13725    4/1971    Japan................................ 260/465.3
46-15491    4/1971    Japan................................ 260/465.3

*Primary Examiner*—Joseph P. Brust
*Attorney, Agent, or Firm*—Waters, Schwartz & Nissen

[57] ABSTRACT

Hydrocarbon mixtures containing n-butenes and isobutene are oxidized or ammoxidized to 1,3-butadiene and methacrolein or methacrylonitrile and n-butenes are oxidized to 1,3-butadiene at an elevated temperature in a gaseous phase, in the presence of a catalyst having the empirical formula:

$$Bi_a Mo_b V_c W_d X_e O_f d$$

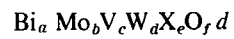

wherein X represents a metal selected from the group consisting of metals of Groups IIa and IIb in the periodic Table and manganese, $a$, $b$, $c$, $d$, $e$ and $f$ represent atomic ratios of the above components, and $a$ is from 0.5 to 10, $b$ is from 0.05 to 5, $c$ is from 0.05 to 2, $d$ is from 0.05 to 3, $e$ is from 0 to 5 and $f$ is a number taken to satisfy the average valences of the above metallic components.

4 Claims, No Drawings

CATALYST AND PROCESS FOR OXIDIZING OR AMMOXIDIZING N-BUTENES AND/OR ISOBUTENE

This invention relates to a catalyst and a process for oxidizing or ammoxidizing a hydrocarbon mixture containing n-butenes and isobutene or oxidizing n-butenes. More particularly, this invention relates to a catalyst and a process for simultaneously oxidizing or ammoxidizing a hydrocarbon mixture containing n-butenes, such as n-butene-1, -cis-n-butene-2and trans-n-butene-2, and isobutene, to 1,3-butadiene and methacrolein or methacrylonitrile or oxidizing the above-mentioned n-butenes, to 1,3-butadiene.

Recently, hydrocarbon mixtures containing n-butenes and isobutene have been secondarily produced in great quantities, for example, as C$_4$ distillation fraction on refining petroleum naphtha or as the residue, i.e. spent-B,B, in the extraction of 1,3-butadiene from the above-mentioned C$_4$ distillation fraction. In the C$_4$ fraction or the residue there are contained n-butenes, isobutene, n-butane, isobutane and the like. n-butenes are usable as the raw material for the production of 1,3-butadiene and isobutene is also usable as the raw material for the production of methacrolein or methacrylonitrile.

However, it is difficult and expensive to isolate n-butenes or isobutene from the hydrocarbon mixtures, because chemical and physical properties of n-butenes, isobutene, n-butane and isobutane are closely similar to each other. Therefore, in general, the residue in the extraction of 1,3-butadiene from the C$_4$ distillation fraction is mainly utilized as fuel.

That is, this invention provides a process for simultaneously producing 1,3-butadiene and methacrolein, or methacrylonitrile in high selectivity by directly oxidizing or ammoxidizing hydrocarbon mixtures containing n-butenes and isobutene as well as such hydrocarbon mixtures as mentioned above. This invention also provides a process for producing 1,3-butadiene in high selectivity by oxidizing n-butenes. Further, this invention provides a catalyst useful for such a process.

It has been known that 1,3-butadiene can be produced by oxidizing n-butenes in the presence of a catalyst or to produce methacrolein or methacrylonitrile by oxidizing or ammoxidizing isobutene in the presence of a catalyst. Also, for these processes, many catalysts have been proposed. However, it is difficult to simultaneously obtain either 1,3-butadiene or methacrolein, or either 1,3-butadiene or methacrylonitrile in high selectivity, by reacting hydrocarbon mixtures containing n-butenes and isobutenes with oxygen or ammonia and oxygen in the presence of the known catalysts usable for the oxidation of n-butenes only or the oxidation or ammoxidation of isobutene only. Particularly, selectivity to 1,3-butadiene in the above-mentioned oxidation or ammoxidation of hydrocarbon mixtures is remarkably lower in comparison with that of the oxidation of only n-butenes.

Methods have also been known which simultaneously oxidize hydrocarbon mixtures containing n-butenes and isobutene to produce 1,3-butadiene and methacrolein. Further, methods have been known which simultaneously ammoxidize hydrocarbon mixtures containing n-butenes and isobutene to produce 1,3-butadiene and methacrylonitrile. Such methods are described, for example, in Japanese Patent Publications Nos. 42-7881, 46-43522 and 46-43523 and German Patent Application laid open No. 2124639. However, there is no catalyst useful either for the production of 1,3-butadiene and methacrolein or for that of 1,3-butadiene and methacrylonitrile. Also it is highly desirable that the catalysts usable for the production of 1,3-butadiene and methacrolein or 1,3-butadiene and methacrylonitrile be improved in activity and selectivity.

An object of the present invention is to provide a catalyst useful for oxidizing or ammoxidizing a hydrocarbon mixture containing n-butenes and isobutene or oxidizing n-butenes.

Another object of the present invention is to provide a catalyst excellent in the activity in the above-mentioned oxidation and ammoxidation.

A further object of the present invention is to provide a process for simultaneously producing 1,3-butadiene and methacrolein for methacrylonitrile by oxidizing or ammoxidizing a hydrocarbon mixture containing n-butenes and isobutene or for producing 1,3-butadiene by oxidizing n-butenes.

A still further object of the present invention is to provide a process excellent in the conversion and the selectivity to the end product in the above-mentioned oxidation or ammoxidation.

Other objects and advantages of the present invention will become apparent from the following description.

The catalyst according to the present invention, useful for simultaneously oxidizing or ammoxidizing a hydrocarbon mixture containing n-butenes and isobutene or for oxidizing n-butenes, can be defined by the following empirical formula:

$$Bi_aMo_bV_cW_dX_eO_f$$

wherein X represents a metal selected from the group consisting of metals of Groups IIa IIb in the Periodic Table and manganese, $a$, $b$, $c$, $d$, $e$ and $f$ represent atomic ratios of the above components, and $a$ is from 0.5 to 10, $b$ is from 0.05 to 5, $c$ is from 0.05 to 2, $d$ is from 0.05 to 3, $e$ is from 0 to 5 and $f$ is a number taken to satisfy the average valences of the above metallic components. In this catalyst, the metallic components may exist in the form of oxides independent from each other or in the form of compounds containing two or more component metals.

In order to obtain the desired 1,3-butadiene and methacrolein or methacrylonitrile, or 1,3-butadiene in high yield, it is particularly preferred that in the above formula, $a$ is from 1 to 8, $b$ is from 0.1 to 3, $c$ is from 0.1 to 1.5, $d$ is from 0.1 to 2 and $e$ is 0 to 3. In this invention, the catalyst may not contain a metal of Groups IIa and IIb in the Periodic Table or manganese. However, activity and selectivity to the end product are further improved by such a metallic component contained in the catalyst. Metals classified in Groups IIa and IIb in Periodic Table may be selected from calcium, zinc, cadmium, barium, strontium, magnesium and mercury.

In this invention, the metallic components are not limited to the above-mentioned structural configurations.

The present invention also provides a process for simultaneously producing 1,3-butadiene and methacrolein or methacrylonitrile by oxidizing or ammoxidizing a hydrocarbon mixture containing n-butenes and isobutene, at an elevated temperature in a gaseous phase in the presence of the above-mentioned catalyst.

The present invention further provides a process for producing 1,3-butadiene by oxidizing n-butenes, at an elevated temperature in a gaseous phase in the presence of the above-mentioned catalyst.

Hydrocarbon mixtures usable for the process according to the invention may be selected from hydrocarbon mixtures containing n-butenes and isobutene and generally, may be the $C_4$ distillation fraction as stated hereinbefore on refining petroleum naphtha or the residue in the extraction of 1,3-butadiene from the $C_4$ distillation fraction. However, it is preferable that olefins having more than 4 carbons atoms contained in the hydrocarbon mixture are in an amount as small as possible, because they are highly reactive under the reaction conditions employed and, therefore, cause a reduction in the conversion of n-butenes and isobutene.

Oxygen usable for the catalytic reaction according to the invention may be pure oxygen gas but it is not necessarily highly purified. Therefore, use of air for this purpose is advantageous from an economical point of view. Generally, air is advantageously used in an amount of 0.4 to 3.0 mole times, preferably 0.5 to 2.0 mole times based on n-butenes, or n-butenes and isobutene contained in the hydrocarbon mixture to limit forming of undesirable by-products.

In ammoxidation, ammonia is advantageously used in an amount of 0.5 to 3.0 mole times preferably 0.8 to 1.5 mole times based on isobutene contained in the hydrocarbon mixture to be used.

The catalyst according to the present invention may be prepared, for example, as follows.

Ammonium metavanadate is dissolved into a solution of ammonium paratungstate in hot water. Into the solution is added a solution of nitrate of a metal of Groups IIa and IIb in the Periodic Table or manganese in water. Then a nitric acid solution of bismuth nitrate and an ammonia solution of ammonium molybdate are simultaneously dropped into the above described two solution mixture. The precipitates yielded with agitating are permitted to stand for a night, filtered, washed, dried and calcined. The catalyst thus obtained consists of bismuth, molybdenum, vanadium, tungsten, a metal of Groups IIa and IIb in the Periodic Table or manganese and oxygen.

The catalyst according to the invention may be prepared by any methods other than the above-mentioned methods and with any compounds, such as salts and oxides, containing componental atoms of the catalyst as the raw material.

The catalyst may be used solely or supported on a suitable carrier. As the carriers, those which bring favorable effects for the reaction involved, for example, silica, alumina, alumina-silica silicates inactivated by treatment at an elevated temperature, may suitably be employed. These carriers may be used together with the catalyst in a suitable proportion.

The catalyst may be shaped into a suitable form such as pellet and grain and dressed to grain of suitable size, according to the purpose of use, in order to provide required mechanical strength. Size and form of the catalyst grain are not critical in this invention. Activity of the catalyst does not depend upon the pelleting methods.

In the process according to the invention, a gaseous diluent may be used together with the gaseous mixture of n-butenes with oxygen or the gaseous mixture of the hydrocarbon mixtures containing n-butenes and isobutene with oxygen or oxygen and ammonia. As the diluents, substantially inactive gases to the reaction involved, for example, steam, nitrogen, carbon dioxide, may suitably be employed. Steam particularly, among these diluents, results in improvements not only in selectivity for 1,3-butadiene and methacrolein or methacrylonitrile but also in the durability of activity of the catalyst and, therefore, it may preferably be used in an amount of more than 0.5 parts based on the molar amount of n-butenes or n-butenes and isobutene.

Exceedingly high reaction temperature results in the reduction of activity of the catalyst and in the increasing of by-products owing to the decompositions of isobutene, n-butenes, etc. Therefore, it is desirable that the reaction is carried out at a temperature of from 300° to 550°C, preferably from 350° to 500°C.

Contact time may suitably be from 0.5 to 40 seconds, preferably from 1 to 15 seconds.

The process of this invention may be carried out under any pressure conditions such as atmospheric, increased and reduced pressures. However, it is convenient from an operational point of view that the process is carried out under atmospheric pressure.

The process of this invention may be carried out in a fluidized bed, moved bed, fixed bed and the like. However, it may advantageously be carried out at one stage in high selectivity since the catalyst of this invention has an excellent feature of bearing the durability of activity for a long period of time, as well as the features of limiting the forming of by-products and yielding 1,3-butadiene and methacrolein or methacrylonitrile.

Recovery of the desired 1,3-butadiene, methacrolein or methacrylonitrile from the obtained reaction mixture may be carried out by the known methods, for example, solvent extraction and condensation.

The invention will be further illustrated with reference to examples, wherein "conversion" and "selectivity" are defined as follows:

$$\text{Conversion (\%)} = \frac{\text{Moles of n-butenes or isobutene consumed}}{\text{Moles of n-butenes or isobutene supplied}} \times 100$$

$$\text{Selectivity (\%)} = \frac{\text{Moles of the product}}{\text{Moles of n-butenes or isobutene consumed}} \times 100$$

Also, except in Examples 3 and 35 through 40, a hydrocarbon mixture, containing n-butenes and isobutene used as a raw gaseous material, is a residue in the extraction of 1,3-butadiene from a $C_4$ distillation fraction when refining petroleum naphtha, as indicated in Table 1.

Table 1

| Component | Content (molar %) | Component | Content (molar %) |
|---|---|---|---|
| propane | 0.1 | isobutene | 47.0 |
| propylene | 0.5 | trans-n-butene-2 | 7.9 |
| isobutane | 1.5 | cis-n-butene-2 | 3.6 |
| n-butane | 8.1 | 1,3-butadiene | 0.4 |
| n-butene-1 | 30.4 | propadiene | 0.5 |

In addition to the components described in Table 1, the above-mentioned hydrocarbon mixture further contained a slight amount of mercaptan, methylacetylene, ethylacetylene, vinylacetylene, etc.

EXAMPLE 1

81.9 g of ammonium metavanadate ($NH_4VO_3$) and 322.9 g of tungstic acid ($H_2WO_4$) were suspended into 1 $l$ of water. Into the suspension were simultaneously added dropwise 298 ml of a solution of bismuth nitrate [$Bi(NO_3)_3 \cdot 5H_2O$] in 10 percent nitric acid (concentration of 650 g/$l$) and 187 ml of a solution of ammonium molybdate [$(NH_4)_6Mo_7O_{24} \cdot 4H_2O$] in 10 percent aqueous ammonia (concentration of 374 g/$l$) under a pH of 4 with agitating and thus they were reacted. Then, the reaction mixture was permitted to stand for a night, the precipitate thus obtained was filtered and washed three times with 1 $l$ of water, and then dried at 120° C. The dry precipitate was calcined at 600°C for 16 hours within an air flow and dressed to grain of 16 to 24 mesh with Tyler standard sieve. Thus, a catalyst was prepared.

The metallic components in the obtained catalyst were in the atomic ratios of Bi : Mo : V : W = 3.2 : 2 : 1 : 0.3 and was mainly composed of $Bi_2O_3 \cdot MoO_3$, $BiVO_4$ and $Bi_2O_3 \cdot 3WO_3$.

8 g of the catalyst diluted with 3 g of alumina support of 16 to 24 mesh was packed into a U-shaped glass reaction tube having an inner diameter of 7 mm. A gaseous mixture of 5 ml of a hydrocarbon mixture containing n-butenes and isobutene and having a composition as described in Table 1, 50 ml of air, 5 ml of ammonia and 40 ml of steam was ammoxidized by being passed through the catalyst packed reaction tube maintained at 430°C at a flow rate of 100 ml/min. The contact time was 4.8 seconds. Under these conditions, conversion of n-butenes was 81.4 percent, conversion of isobutene was 89.2%, selectivity to 1,3-butadiene was 85.2% and selectivity to methacrylonitrile was 87.6 percent.

EXAMPLE 2

With 8 g of the catalyst prepared as described in Example 1, a gaseous mixture of 5 ml of ahhydrocarbon mixture as described in Table 1, 55 ml of air and 40 ml of steam was oxidized by being passed through a reaction tube as described in Example 1 at 430°C at a flow rate of 100 ml/min. The contact time was 4.8 seconds. Under these conditions, conversions of n-butene and isobutene were 82.6 percent and 88.2% percent, respectively and selectivities to 1,3-butadiene and methacrolein were 84.3 percent and 86.7%, respectively.

EXAMPLE 3

8 g of the catalyst prepared as described in Example 1 and diluted with 3 g of alumina support was packed into a reaction tube as described in Example 1. A gaseous mixture of 10 ml of n-butene-1, 80 ml of air and 10 ml of steam was oxidized by being passed through the reaction tube at 430°C at a flow rate of 100 ml/min. The contact time was 4.8 seconds. In this reaction, conversion of n-butene-1 was 83.4 percent and selectivity to 1,3-butadiene was 86.2 percent.

EXAMPLES 4 through 6

Ammoxidation of a hydrocarbon mixture as in Table 1 was carried out under the same conditions as those of Example 1, using the catalysts prepared as described in Example 1 except that the atomic ratios of the component metals were varied as indicated in Table 2. Table 3 shows the results.

Table 2

| Example No. | Atomic ratio | | | |
|---|---|---|---|---|
| | Bi | Mo | V | W |
| 4 | 2.1 | 1.8 | 0.1 | 0.3 |
| 5 | 5.4 | 0.8 | 0.6 | 6.0 |
| 6 | 5.1 | 0.2 | 0.9 | 6.0 |

Table 3

| Example No. | Conversion (%) | | Selectivity (%) | |
|---|---|---|---|---|
| | n-butenes | isobutene | 1,3-butadiene | methacrylonitrile |
| 4 | 81.2 | 84.6 | 80.9 | 84.1 |
| 5 | 80.5 | 85.6 | 83.1 | 87.8 |
| 6 | 81.2 | 85.6 | 81.2 | 89.3 |

EXAMPLE 7

298 ml of a solution of bismuth nitrate in 10% nitric acid (concentration of 650 g/$l$) and 187 ml of a solution of ammonium molybdate in aqueous ammonia were reacted by simultaneously adding them dropwise into 1 $l$ of water while maintaining the pH of the solution at 4 to yield precipitate. Then, the precipitate was permitted to stand for a night, filtered and washed with water, and then dried at 120°C. The dry precipitate was calcined at 600°C for 16 hours within an air flow. Thus, bismuth molybdate ($Bi_2O_3 \cdot 2MoO_3$) was prepared.

523 ml of nitric acid solution of bismuth nitrate (concentration of 650 g/$l$) was dropped into and reacted with a suspension of 81.9 g of ammonium metavanadate in 1 $l$ of water while agitating to yield precipitate. The precipitate was treated in the same way as that of bismuth molybdate to obtained bismuth vanadate ($BiVO_4$).

643 ml of nitric acid solution of bismuth nitrate (concentration of 650 g/$l$) was dropped into and reacted with a suspension of 322.7 g of tungstic acid in 1 $l$ of water with agitating to yield precipitate. The precipitate was treated in the same way as that of bismuth molybdate to obtain bismuth tungstate ($Bi_2O_3 \cdot 3WO_3$).

Bismuth molybdate, bismuth vanadate and bismuth tungstate thus obtained were mixed together so that the metallic components in the catalyst were in the atomic ratios of Bi : Mo : V : W = 3.2 : 2 : 1 : 0.3 and a small amount of water was added thereinto. The mixture was kneaded for 2 hours, dried at 120°C, calcined at 600°C for 16 hours within an air flow and then dressed to grain of 16 to 24 mesh as in Example 1. Thus, a catalyst was prepared.

With 8 g of the catalyst, catalytic reaction (ammoxidation) of a hydrocarbon mixture as in Table 1 was carried out under the same conditions as those of Example 1. In this reaction, conversions of n-butenes and isobutene were 85.3 percent and 92.1 percent respectively, and selectivities to 1,3-butadiene and methacrylonitrile were 84.1 percent and 87.1 percent, respectively.

EXAMPLES 8 through 11

Ammoxidation of a hydrocarbon mixture as in Table 1 was carried out under the same conditions as those of Example 1, using the catalysts prepared as described in Example 7 except that the atomic ratios of the component metals were varied as indicated in Table 4. Table 5 shows the results.

Table 4

| Example No. | Atomic ratio | | | |
|---|---|---|---|---|
| | Bi | Mo | V | W |
| 8 | 2.1 | 1.8 | 0.1 | 0.3 |
| 9 | 1.5 | 0.6 | 0.7 | 0.3 |
| 10 | 5.4 | 0.8 | 0.6 | 6.0 |
| 11 | 5.1 | 0.2 | 0.9 | 6.0 |

Table 5

| Example No. | Conversion (%) | | Selectivity (%) | |
|---|---|---|---|---|
| | n-butenes | isobutene | 1,3-butadiene | methacrylonitrile |
| 8 | 80.5 | 83.3 | 81.6 | 83.2 |
| 9 | 87.3 | 94.2 | 84.5 | 88.3 |
| 10 | 80.1 | 84.1 | 82.6 | 86.5 |
| 11 | 80.4 | 85.3 | 80.6 | 87.2 |

EXAMPLE 12

With the catalyst prepared as in Example 7, oxidation of a hydrocarbon mixture as in Table 1 was carried out under the same conditions as those of Example 2. In this reaction, conversions of n-butenes and isobutene were 84.3 percent and 92.6 percent, respectively, and selectivities to 1,3-butadiene and methacrolein were 83.1% and 86.7%, respectively.

EXAMPLE 13

Bismuth molybdate ($Bi_2O_3.3MoO_3$) was prepared as described in Example 7 except that amounts of the nitric acid solution of bismuth nitrate and the ammonia solution of ammonium molybdate were varied. Also, bismuth tungstate ($3Bi_2O_3.4WO_3$) was prepared as described in Example 7 except that amounts of tungstic acid and the nitric acid solution of bismuth nitrate were varied. Bismuth molybdate and bismuth tungstate thus obtained and bismuth vanadate ($BiVO_4$) prepared as described in Example 7 were mixed together so that the above-mentioned compounds were in amounts of 0.5 parts by mole, 0.5 parts by mole and 0.1 parts by mole, respectively. Then, a catalyst was prepared as described in Example 7. The metallic components in the catalyst were in the atomic ratios of Bi : Mo : V : W = 3.2 : 2 : 1 : 0.3.

With the catalyst, ammoxidation was carried out under the same conditions as those of Example 1. In this reaction, conversions of n-butenes and isobutene were 82.6 percent and 89.7 percent, respectively, and selectivities to 1,3-butadiene and methacrylonitrile were 82.5 percent and 85.5 percent, respectively.

EXAMPLES 14 through 16

Ammoxidation of a hydrocarbon mixture as in Table 1 was carried out under the same conditions as those of Example 1, using the catalysts prepared as described in Example 13 except that the atomic ratios of the metallic components were varied as indicated in Table 6. Table 7 shows the results.

Table 6

| Example No. | Atomic ratio | | | |
|---|---|---|---|---|
| | Bi | Mo | V | W |
| 14 | 2.1 | 2.4 | 0.2 | 0.2 |
| 15 | 1.7 | 1.2 | 0.6 | 0.2 |
| 16 | 7.5 | 1.5 | 0.5 | 4.0 |

Table 7

| Example No. | Conversion (%) | | Selectivity (%) | |
|---|---|---|---|---|
| | n-butanes | isobutene | 1,3-butadiene | methacrylonitrile |
| 14 | 81.6 | 83.8 | 80.7 | 82.1 |
| 15 | 84.2 | 89.9 | 82.3 | 83.3 |
| 16 | 80.5 | 83.4 | 79.8 | 82.4 |

EXAMPLE 17

With the catalyst prepared as in Example 13, oxidation of a hydrocarbon mixture as in Table 1 was carried out under the same conditions as those of Example 2. In this reaction, conversions of n-butenes and isobutene were 80.4 percent and 88.6 percent, respectively, and selectivities to 1,3-butadiene and methacrolein were 82.8 percent and 86.3 percent, respectively.

EXAMPLES 18 through 20

Bismuth tungstate ($Bi_2O_3.WO_3$) was prepared as described in Example 7 except that amounts of bismuth nitrate and tungstic acid were varied. Bismuth tungstate thus obtained and bismuth molybdate ($Bi_2O_3.2MoO_3$) and bismuth vanadate ($BiVO_4$) prepared as described in Example 7 were mixed together and thus catalysts having the compositions of varied atomic ratios as described in Table 8 were obtained.

Ammoxidation of a hydrocarbon mixture as in Table 1 was carried out with these catalysts under the same conditions as those of Example 1. Table 9 shows the results.

Table 8

| Example No. | Atomic ratio | | | |
|---|---|---|---|---|
| | Bi | Mo | V | W |
| 18 | 3.2 | 2.0 | 1.0 | 0.3 |
| 19 | 1.9 | 1.4 | 0.3 | 0.1 |
| 20 | 1.6 | 0.8 | 0.6 | 0.1 |

Table 9

| Example No. | Conversion (%) | | Selectivity (%) | |
|---|---|---|---|---|
| | n-butenes | isobutene | 1,3-butadiene | methacrylonitrile |
| 18 | 79.6 | 80.5 | 80.6 | 81.4 |
| 19 | 76.4 | 80.2 | 82.6 | 85.4 |
| 20 | 78.8 | 84.6 | 80.3 | 83.1 |

EXAMPLES 21 through 24

Bismuth molybdate ($Bi_2O_3.2MoO_3$) and bismuth vanadate ($BiVO_4$) prepared as described in Example 7 and tungsten trioxide ($WO_3$) at the market were mixed together and kneaded with water, dried at 120°C then calcined at 600°C for 16 hours and thus catalysts having the atomic ratios as described in Table 10 were obtained.

Ammoxidation of a hydrocarbon mixture as in Table 1 was carried out with these catalysts under the same conditions as those of Example 1. Table II shows the results.

Table 10

| Example No. | Atomic ratio | | | |
|---|---|---|---|---|
| | Bi | Mo | V | W |
| 21 | 3.2 | 2.0 | 1.0 | 0.3 |
| 22 | 1.5 | 1.0 | 0.5 | 0.4 |
| 23 | 1.7 | 1.4 | 0.3 | 0.7 |
| 24 | 1.3 | 0.6 | 0.7 | 2.0 |

Table 11

| Example No. | Conversion (%) | | Selectivity (%) | |
|---|---|---|---|---|
| | n-butenes | isobutene | 1,3-butadiene | methacrylonitrile |
| 21 | 84.8 | 91.6 | 83.9 | 87.2 |
| 22 | 79.4 | 81.6 | 82.1 | 84.6 |
| 23 | 81.2 | 83.3 | 85.4 | 86.2 |
| 24 | 79.3 | 81.4 | 83.1 | 84.4 |

EXAMPLE 25

233 g of bismuth trioxide ($Bi_2O_3$) and 90.9 g of vanadium pentoxide ($V_2O_5$) were mixed together and kneaded with a small amount of water, dried at 120°C and then calcined at 600°C for 16 hours. Bismuth vanadate ($BiVO_4$) thus obtained and bismuth molybdate ($Bi_2O_3 \cdot 2MoO_3$) and bismuth tungstate ($Bi_2O_3 \cdot 3WO_3$) prepared as described in Example 7 were mixed together and kneaded with water, dried, then calcined and thus a catalyst was prepared. The metallic components in the obtained catalyst were in the atomic ratios of Bi : Mo : V : W = 3.2 : 2 : 1 : 0.3.

With 8 g of the catalyst, ammoxidation of a hydrocarbon mixture as in Table 1 was carried out under the same conditions as those of Example 1. In this reaction, conversions of n-butenes and isobutene were 84.2 percent and 92.6 percent, respectively, and selectivities to 1,3-butadiene and methacrylonitrile were 83.3 percent and 88.4 percent, respectively.

EXAMPLE 26

93.2 g of bismuth trioxide and 139.1 g of tungsten trioxide were mixed together and kneaded with a small amount of water, dried at 120°C and then calcined at 600°C for 16 hours. Bismuth tungstate ($Bi_2O_3 \cdot 3WO_3$) thus obtained and bismuth molybdate ($Bi_2O_3 \cdot 2MoO_3$) and bismuth vanadate ($BiVO_4$) prepared as described in Example 7 were mixed together and then a catalyst was prepared. The metallic components in the catalyst were in the atomic ratios of Bi : Mo : V : W = 3.2 : 2 : 1 : 0.3.

Ammoxidation of a hydrocarbon mixture as in Table 1 was carried out with 8 g of the obtained catalyst under the same conditions as those of Example 1. In this reaction, conversions of n-butenes and isobutene were 81.6 percent and 91.4 percent, respectively, and selectivities to 1,3-butadiene and methacrylonitrile were 83.6 percent and 85.5 percent, respectively.

EXAMPLES 27 through 29

Ammoxidation of a hydrocarbon mixture as in Table 1 was carried out with a catalyst as described in Example 1 in the same way as that of Example 1 except that reaction conditions were changed into those of Table 12. The contact time was 4.8 seconds. Table 13 shows the results.

Table 12

| Example No. | Temperature (°C) | Gaseous composition (ml) | | | |
|---|---|---|---|---|---|
| | | hydrocarbon mixture | air | ammonia | steam |
| 27 | 350 | 5 | 60 | 5 | 30 |
| 28 | 400 | 10 | 80 | 5 | 5 |
| 29 | 500 | 5 | 45 | 10 | 40 |

Table 13

| Example No. | Conversion (%) | | Selectivity (%) | |
|---|---|---|---|---|
| | n-butenes | isobutene | 1,3-butadiene | methacrylonitrile |
| 27 | 72.4 | 79.2 | 81.6 | 82.2 |
| 28 | 76.5 | 84.6 | 83.2 | 85.4 |
| 29 | 89.6 | 96.3 | 76.3 | 83.1 |

EXAMPLE 30

11.7 g of ammonium metavanadate ($NH_4VO_3$) was added into a solution of 27.0 g of ammonium paratungstate $[(NH_4)_{10}W_{12}O_{41} \cdot 5H_2O]$ in 2 l of hot water (70°–80°C). Into the solution was added a solution of 89.2 g of zinc nitrate $[Zn(NO_3)_2 \cdot 6H_2O]$ in 200 to 300 ml of water and then were added simultaneously 300 ml on a solution of bismuth nitrate $[Bi(NO_3)_3 \cdot 5H_2O]$ in 10 percent nitric acid (concentration of 650 g/l) and 130 ml of a solution of ammonium molybdate $[(NH_4)_6Mo_7O_{24} \cdot 4H_2O]$ in 10% aqueous ammonia (concentration of 374 g/l) under a pH of 4 while agitating. Thus, they were reacted to yield precipitate. The precipitate was stored and aged for a night, filtered, washed with water and then dried at 120°C. The dry precipitate was calcined at 550°C for 16 hours and dressed to grain of 20 to 28 mesh with a Tyler standard sieve. The metallic components in the catalyst thus obtained were in the atomic ratios of Bi : Mo : V : W : Zn = 3 : 1 : 1 : 1 : 3.

4 g of the catalyst diluted with 3 g of alumina support of 20 to 28 mesh was packed into a reaction tube as described in Example 1. A gaseous mixture of 5ml of a hydrocarbon mixture as described in Table 1, 50 ml of air, 5 ml of ammonia and 40 ml of steam was ammoxidized by being passed through the reaction tube maintained at 400°C at a flow rate of 100 ml/min. The contact time was 2.4 seconds. Under these conditions, conversion of n-butenes was 86.7 percent, conversion of isobutene was 89.6 percent, selectivity to 1,3-butadiene was 83.7 percent and selectivity to mechacrylonitrile was 85.5 percent.

EXAMPLE 31

4 g of the catalyst prepared as described in Example 30 and diluted with 3 g of alumina support was packed into a reaction tube as in Example 1. A gaseous mixture of 10 ml of n-butene-1, 80 ml of air and 10 ml of steam was catalytically reacted by being passed through the reaction tube at 400°C at a flow rate of 100 ml/min. The contact time was 2.4 seconds. In this reaction, conversion of n-butene-1 was 89.5% and selectivity to 1,3-butadiene was 86.1%.

EXAMPLES 32 through 36

Five kinds of catalyst as in Table 14 were prepared as described in Example 30, except that 71.0 g of calcium nitrate [$Ca(NO_3)_2 \cdot 4H_2O$], 92.7 g of cadmium nitrate [$Cd(NO_3)_2 \cdot 4H_2O$], 78.4 g of barium nitrate [$Ba(NO_3)_2$], 86.1 g of manganese nitrate [$Mn(NO_3)_2 \cdot 6H_2O$] and 85.1 g of strontium nitrate [$Sr(NO_3)_2 \cdot 4H_2O$] were used instead of 89.2 g of zinc nitrate.

Using these catalysts, a gaseous mixture as described in Example 31 was catalytically reacted under the same conditions as those of Example 31. Table 15 shows the results.

Table 14

| Example No. | Bi | Mo | V | W | Ca | Cd | Ba | Mn | Sr |
|---|---|---|---|---|---|---|---|---|---|
| 32 | 3 | 1 | 1 | 1 | 3 | — | — | — | — |
| 33 | 3 | 1 | 1 | 1 | — | 3 | — | — | — |
| 34 | 3 | 1 | 1 | 1 | — | — | 3 | — | — |
| 35 | 3 | 1 | 1 | 1 | — | — | — | 3 | — |
| 36 | 3 | 1 | 1 | 1 | — | — | — | — | 3 |

Table 15

| Example No. | Conversion of n-butene-1 (%) | Selectivity to 1,3-butadiene (%) |
|---|---|---|
| 32 | 88.1 | 87.1 |
| 33 | 89.0 | 85.6 |
| 34 | 88.5 | 84.9 |
| 35 | 90.7 | 85.7 |
| 36 | 89.6 | 85.2 |

EXAMPLES 37 through 40

With the catalyst prepared as described in Example 30, oxidation or ammoxidation of a hydrocarbon mixture as in Table 1 was carried out under the conditions as described in Tables 16a and 16b. Table 17 shows the results.

Table 16a

| Example No. | Reaction | Temp. (°C) | Contact time (sec) | Amount of catalyst (g) | Flow rate (ml/min) |
|---|---|---|---|---|---|
| 37 | Oxidation | 400 | 2.4 | 4 | 100 |
| 38 | " | 430 | 1.2 | 4 | 200 |
| 39 | " | 400 | 2.4 | 4 | 100 |
| 40 | Ammoxidation | 390 | 3.6 | 6 | 200 |

Table 16b

| Example No. | Gaseous composition (ml) | | | |
|---|---|---|---|---|
| | hydrocarbon mixture | air | ammonia | steam |
| 37 | 5 | 55 | — | 40 |
| 38 | 10 | 110 | — | 80 |
| 39 | 7 | 60 | — | 33 |
| 40 | 5 | 50 | 5 | 40 |

Table 17

| Example No. | Conversion (%) | | Selectivity (%) | |
|---|---|---|---|---|
| | n-butanes | iso-butene | butadiene | meth-acrolein | methacrolonitrile |
| 37 | 89.4 | 93.3 | 83.5 | 88.7 | — |
| 38 | 91.4 | 94.5 | 85.6 | 87.3 | — |
| 39 | 86.1 | 96.2 | 84.1 | 86.5 | — |
| 40 | 87.4 | 92.4 | 83.7 | — | 89.2 |

EXAMPLES 41 through 45

Five kinds of catalyst, each having the composition of varied atomic ratios as described in Table 18 were prepared as described in Example 30. A gaseous mixture of 5 ml of a hydrocarbon mixture as in Table 1, 55 ml of air and 40 ml of steam was oxidized by being passed through the reaction tube, packed with 4 g of the catalyst, at 400°C at a flow rate of 100 ml/min. The contact time was 2.4 seconds. Table 19 shows the results.

Table 18

| Example No. | Bi | Mo | Atomic ratio V | W | Zn |
|---|---|---|---|---|---|
| 41 | 3 | 0.5 | 1 | 1 | 3 |
| 42 | 1 | 1 | 1 | 1 | 3 |
| 43 | 3 | 1 | 0.1 | 1 | 2 |
| 44 | 3 | 1.5 | 0.5 | 0.5 | 2 |
| 45 | 2 | 1 | 0.5 | 1 | 0.5 |

Table 19

| Ex. No. | Conversion (%) | | Selectivity (%) | |
|---|---|---|---|---|
| | n-butenes | isobutene | 1,3-butadiene | methacrolein |
| 41 | 87.6 | 92.1 | 85.3 | 87.2 |
| 42 | 86.8 | 90.6 | 84.2 | 86.9 |
| 43 | 85.2 | 92.3 | 89.6 | 88.4 |
| 44 | 88.4 | 94.9 | 88.2 | 89.1 |
| 45 | 84.2 | 92.6 | 87.4 | 86.0 |

EXAMPLE 46

11.7 g of ammonium metavanadate was added into a solution of 27.0 g of ammonium paratungstate in 2 l of hot water (70°–80°C). Into the solution was added a solution of 89.2 g of zinc nitrate in 200 ml of water and then there was simultaneously added a solution of 17.7 g of ammonium molybdate in 130 ml of 10 percent aqueous ammonia and a solution of 148.5 g of bismuth nitrate in 300 ml of 10% nitric acid. The obtained reaction mixture was heated in an evaporation dish with agitating to dryness and then calcined at 550°C for 16 hours. The catalyst thus obtained had the same atomic ratio as that of Example 30.

With 4 g of the catalyst, oxidation was carried out under the same conditions as those of Examples 41 –45 and thus the following result was obtained:

conversion of n-butenes: 85.3%
conversion of isobutene: 87.6%;
selectivity to 1,3-butadiene: 85.0%, and;
selectivity to methacrolein: 86.2%.

EXAMPLE 47

18.2 g of vanadium pentoxide ($V_2O_5$) and 23.1 g of tungsten trioxide (WO$_3$) were simultaneously suspended into 2 l of water heated to 70° to 80°C. Into the suspension was added a solution of 89.2 g of zinc nitrate in 200 ml of hot water (70°-80°C) and maintained under agitation, and then there was simultaneously added a solution of 148.5 g of bismuth nitrate in 300 ml of 10 percent nitric acid and a solution of 17.6 g of ammonium molybdate in 130 ml of 10 percent aqueous ammonia The obtained reaction mixture was heated in an evaporation dish to dryness and then calcined at 550°C for 16 hours. The catalyst thus obtained had the same atomic ratio as that of Example 30.

Using 4 g of the catalyst, oxidation was carried out under the same conditions as those of Examples 41–45 and thus the following result was obtained:

| | |
|---|---|
| conversion of n-butenes: | 80.3%; |
| conversion of isobutenes: | 95.3%; |
| selectivity to 1,3-butadiene: | 86.3%, and; |
| selectivity to methacrolein: | 87.1%. |

EXAMPLES 48 through 52

Five kinds of catalyst as described in Table 20 were prepared as described in Example 30 except that cadmium nitrate was used instead of zinc nitrate. Ammoxidation in the presence of 4 g of the catalyst was carried out under the same conditions as those of Example 30. Table 21 shows the results.

Table 20

| Example No. | Atomic ratio | | | | |
|---|---|---|---|---|---|
| | Bi | Mo | V | W | Cd |
| 48 | 3 | 1 | 1 | 1 | 3 |
| 49 | 3 | 1 | 1 | 1 | 1 |
| 50 | 1 | 3 | 1 | 1 | 2 |
| 51 | 2 | 3 | 0.5 | 0.5 | 0.5 |
| 52 | 1 | 0.5 | 1 | 1 | 2 |

Table 21

| Example No. | Conversion (%) | | Selectivity (%) | |
|---|---|---|---|---|
| | n-butenes | isobutene | 1,3-butadiene | methacrylo-nitrile |
| 48 | 84.6 | 88.6 | 85.8 | 86.7 |
| 49 | 85.8 | 89.4 | 84.2 | 87.1 |
| 50 | 85.7 | 89.6 | 85.6 | 89.3 |
| 51 | 83.3 | 88.5 | 86.7 | 86.2 |
| 52 | 82.5 | 87.6 | 84.7 | 87.0 |

EXAMPLE 53

A catalyst was prepared as described in Examples 48–52, except that the metallic components in the catalyst were in the atomic ratios of Bi : Mo : V : W : Cd = 3 : 1 : 1 : 1 : 3. Oxidation with 4 g of the catalyst was carried out under the same conditions as those of Examples 41 –45 and thus the following results was obtained:

| | |
|---|---|
| conversion of n-butenes: | 86.5%; |
| conversion of isobutene: | 92.6% |
| selectivity to 1,3-butadiene: | 87.8%, and; |
| selectivity to methacrolein: | 86.6%. |

EXAMPLE 54

Catalytic oxidation with 4 g of the catalyst prepared as described in Example 53 was carried out under the following conditions:

| | |
|---|---|
| temperature: | 430°C; |
| contact time: | 1.2 sec; |
| composition of gaseous mixture: | 10 ml of hydrocarbon mixture as in Table 1; 110 ml of air and 80 ml of steam, and; |
| flow rate: | 200 ml/min. |

Under these conditions, conversion of n-butenes was 82.5 percent, conversion of isobutene was 87.6 percent, selectivity to 1,3-butadiene was 84.7 percent and selectivity to methacrolein was 86.8%.

EXAMPLES 55 through 58

Each catalyst as described in Table 22a was prepared as described in Example 30, except that calcium nitrate [Ca(NO$_3$)$_2$.4H$_2$O] was used instead of zinc nitrate. Oxidation or ammoxidation with 4 g of the catalyst was carried out at 400°C at a flow rate of 100 ml/min for a gaseous mixture as described in Table 22b. The contact time was 2.4 seconds. Table 23 shows the results.

Table 22a

| Example No. | Atomic ratio | | | | |
|---|---|---|---|---|---|
| | Bi | Mo | V | W | Ca |
| 55 | 2 | 1 | 1 | 1 | 2 |
| 56 | 2 | 1 | 1 | 1 | 2 |
| 57 | 2 | 2 | 1 | 1 | 2 |
| 58 | 2 | 2 | 1 | 1 | 2 |

Table 22b

| Example No. | Reaction | Gaseous composition (ml) | | | |
|---|---|---|---|---|---|
| | | hydrocarbon mixture | air | ammonia | steam |
| 55 | oxidation | 5 | 55 | — | 40 |
| 56 | ammoxidation | 5 | 50 | 5 | 40 |
| 57 | oxidation | 5 | 55 | — | 40 |
| 58 | ammoxidation | 5 | 50 | 5 | 40 |

Table 23

| Example No. | Conversion (%) | | Selectivity (%) | | |
|---|---|---|---|---|---|
| | n-butenes | iso-butene | 1,3-butadiene | meth-acrolein | methacrylo-nitrile |
| 55 | 87.2 | 90.2 | 81.2 | 87.6 | — |
| 56 | 86.4 | 90.6 | 84.3 | — | 88.1 |
| 57 | 87.0 | 92.4 | 82.6 | 85.7 | — |
| 58 | 85.3 | 89.4 | 83.5 | — | 86.8 |

EXAMPLE 59

A catalyst was prepared as described in Example 30 except that 85.1 g of strontium nitrate [Sr(NO$_3$)$_2$.4H$_2$O] was used instead of zinc nitrate. The metallic components in the catalyst were in the atomic ratios of Bi : Mo : V : W : Sr = 3 : 1 : 1 : 1 : 3.

Ammoxidation with 4 g of the catalyst was carried out under the same conditions of Example 30 and thus the following result was obtained:

| | |
|---|---|
| conversion of n-butenes: | 87.5%; |
| conversion of isobutene: | 89.6%; |

-Continued selectivity to 1,3-butadiene: 81.8%, and;
selectivity to methacrylonitrile: 86.4%.

EXAMPLE 60

Oxidation with 4 g of the catalyst prepared as in Example 59 was carried out under the same conditions as those of Examples 41–45, and thus the following result was obtained:

conversion of n-butenes: 86.2%;
conversion of isobutene: 89.9%;
selectivity to 1,3-butadiene: 85.2%, and;
selectivity to methacrolein: 86.8%.

EXAMPLE 61

A catalyst was prepared as described in Example 30 except that 78.4 g of barium nitrate was used instead of zinc nitrate. The metallic components in the catalyst were in the atomic ratios of Bi : Mo : V : W : Ba = 3 : 1 : 1 : 1 : 3. Ammoxidation with 4 g of the catalyst was carried out under the same conditions as those of Example 30. In this reaction, conversions of n-butenes and isobutene were 87.8% and 93.2%, respectively, and selectivities to 1,3-butadiene and methacrylonitrile were 89.2% and 87.7%, respectively.

EXAMPLE 62

Catalytic oxidation with 4 g of the catalyst prepared as described in Example 61 was carried out under the same conditions as those of Examples 41 –55. In this reaction, conversions of n-butenes and isobutene were 87.4 percent and 95.5 percent, respectively, and selectivities to 1,3-butadiene and methacrolein were 89.6 percent and 88.1 percent, respectively.

EXAMPLE 63

A catalyst was prepared as described in Example 30 except that 86.1 g of manganese nitrate [$Mn(NO_3)_2 \cdot 6H_2O$] was used instead of zinc nitrate. The metallic components in the catalyst were in the atomic ratios of Bi : Mo : V : W : Mn = 3 : 1 : 1 : 1 : 3. Ammoxidation with 4 g of the catalyst was carried out under the same conditions as those of Example 30 and thus the following result was obtained:

conversion of n-butenes: 84.2%;
conversion of isobutene: 89.2%;
selectivity to 1,3-butadiene: 83.1%, and;
selectivity to methacrylonitrile: 89.2%.

EXAMPLES 64 and 65

Two kinds of catalyst as described in Table 24 were prepared as described in Example 63 and ammoxidation with 4 g of each obtained catalyst was carried out under the same condition as those of Example 30. Table 25 shows the results.

Table 24

| Example No. | Atomic ratio | | | | |
|---|---|---|---|---|---|
| | Bi | Mo | V | W | Mn |
| 64 | 3 | 1 | 1 | 1 | 0.5 |
| 65 | 2 | 0.5 | 0.5 | 1.2 | 1 |

Table 25

| Example No. | Conversion (%) | | Selectivity (%) | |
|---|---|---|---|---|
| | n-butenes | isobutene | 1,3-butadiene | methacrylonitrile |
| 64 | 85.8 | 91.2 | 87.2 | 87.6 |
| 65 | 86.2 | 87.9 | 85.5 | 88.0 |

EXAMPLE 66

Catalytic oxidation with 4 g of the catalyst prepared as in Example 63 was carried out under the same conditions as those of Examples 41 –45 and thus the following result was obtained:

conversion of n-butenes: 86.1%;
conversion of isobutene: 89.6%;
selectivity to 1,3-butadiene: 83.6%, and;
selectivity to methacrolein: 88.4%.

COMPARISON EXAMPLE 1

169 g of antimony trioxide was dissolved into a small amount of water, into the solution was added 1 l of water to hydrolyze and then was added 250 ml of diluted aqueous ammonia to complete the hydrolysis. The reaction mixture was filtered and washed. Thus, an antimony oxide paste was obtained. Into the antimony oxide paste was added 49.7 g of ammonium molybdate powder. Then, this was heated with a small amount of water under agitation and a solution of 101.3 g of bismuth nitrate in 15.9 ml of 60% nitric acid and 40 ml of water was added. The reaction mixture was heated to dryness until nitrogen dioxide and nitrogen monoxide had ceased to evolve and thus a solid was obtained. The obtained solid was grained, dressed to grain of 14 to 20 mesh, calcined at 540°C for 18 hours and then employed as a catalyst. The metallic components in the catalyst were in the atomic percentile ratios of Mo : 32.5 percent, Bi : 50.0% and Sb : 17.5% and the catalyst was proved to mainly consist of bismuth antimonate and bismuth molybdate.

Ammoxidation with 8 g of the catalyst was carried out under the same conditions as those of Example 1. The result is shown in Table 26.

COMPARISON EXAMPLE 2

33.4 g of ammonium metavanadate was suspended into 1 l of water. Into the suspension were added 425.7 ml of a solution of bismuth nitrate in nitric acid (concentration of 650 g/l) and 133.7 ml of a solution of ammonium molybdate in aqueous ammonia (concentration of 374 g/l) with agitating to yield precipitate. The precipitate was treated as described in Example 1 and thus a catalyst was prepared. The catalyst was mainly composed of $Bi_2O_3 \cdot 2MoO_3$ and $BiVO_4$.

Ammoxidation with 8 g of the catalyst was carried out under the same conditions as those of Example 1. The result is shown in Table 26.

COMPARISON EXAMPLE 3

Ammoxidation with 8 g of bismuth molybdate ($Bi_2O_3 \cdot 2MoO_3$) prepared as described in Example 7 was carried out under the same conditions as those of Example 1. The result is shown in Table 26.

Table 26

| Comparison Example No. | Conversion (%) | | Selectivity (%) | |
| --- | --- | --- | --- | --- |
| | n-butenes | isobutene | 1,3-butadiene | methacrylonitrile |
| 1 | 36.7 | 68.7 | 21.3 | 81.0 |
| 2 | 42.8 | 52.6 | 28.4 | 61.8 |
| 3 | 34.6 | 65.8 | 22.7 | 78.4 |

COMPARISON EXAMPLE 4

Oxidation with 4 g of bismuth molybdate prepared as described in Example 7 was carried out under the same condition as those of Examples 41–45 and thus the following result was obtained:

| | |
| --- | --- |
| conversion of n-butenes: | 32.4%; |
| conversion of isobutene: | 60.7% |
| selectivity to 1,3-butadiene: | 20.3%, and; |
| selectivity to methacrolein: | 73.6%. |

What we claim is:

1. A process for simultaneously producing 1,3-butadiene and methacrylonitrile by ammoxidizing a hydrocarbon mixture consisting essentially of n-butenes and isobutene at 350 to 550°C in a gaseous phase in the presence of a catalyst, said hydrocarbon mixture predominantly containing the n-butenes and isobutene, said catalyst consisting of an oxide composition containing the elements according to the formula:

$$Bi_aMo_bV_cW_dX_eO_f$$

wherein X represents a metal selected from the group consisting of metals in Groups IIa and IIb in the Periodic Table and manganese, and each of the subcripts $a$, $b$, $c$, $d$, and $e$ denotes the atomic ratio of the respective element falling within the following ranges: $a$ is from 0.5 to 10, $b$ is from 0.05 to 5, $c$ is from 0.05 to 2, $d$ is from 0.05 to 3, and $e$ is from 0 to 5, and $f$ is a value corresponding to the oxides formed from the above components by combination and is a number taken to satisfy the average valences of the metals employed, the metal components of the catalyst being in the form of oxides independent from each other or in the form of compounds containing two or more component metals and being produced by intimately mixing at least one compound selected from the group consisting of the salts, the oxides and mixtures thereof of each of respective elements in an aqueous system, heating to dryness, and then subsequently calcining at a considerably higher temperature.

2. A process as claimed in claim 1, wherein said ammoxidizing is carried out in the presence of a diluent gas, inactive for the ammoxidizing, selected from the group consisting of steam, nitrogen gas and carbon dioxide.

3. A process as claimed in claim 1, wherein said metal represented by X is selected from the group consisting of calcium, zinc, cadmium, barium, strontium, magnesium and mercury.

4. A process according to claim 1, wherein said hydrocarbon mixture is a spent fraction prepared by extracting 1,3-butadiene from the C$_4$ fraction of petroleum.

* * * * *